May 27, 1958 — O. STADER — 2,836,004
DEVICE FOR REMOVING FISH HOOKS
Filed June 27, 1956
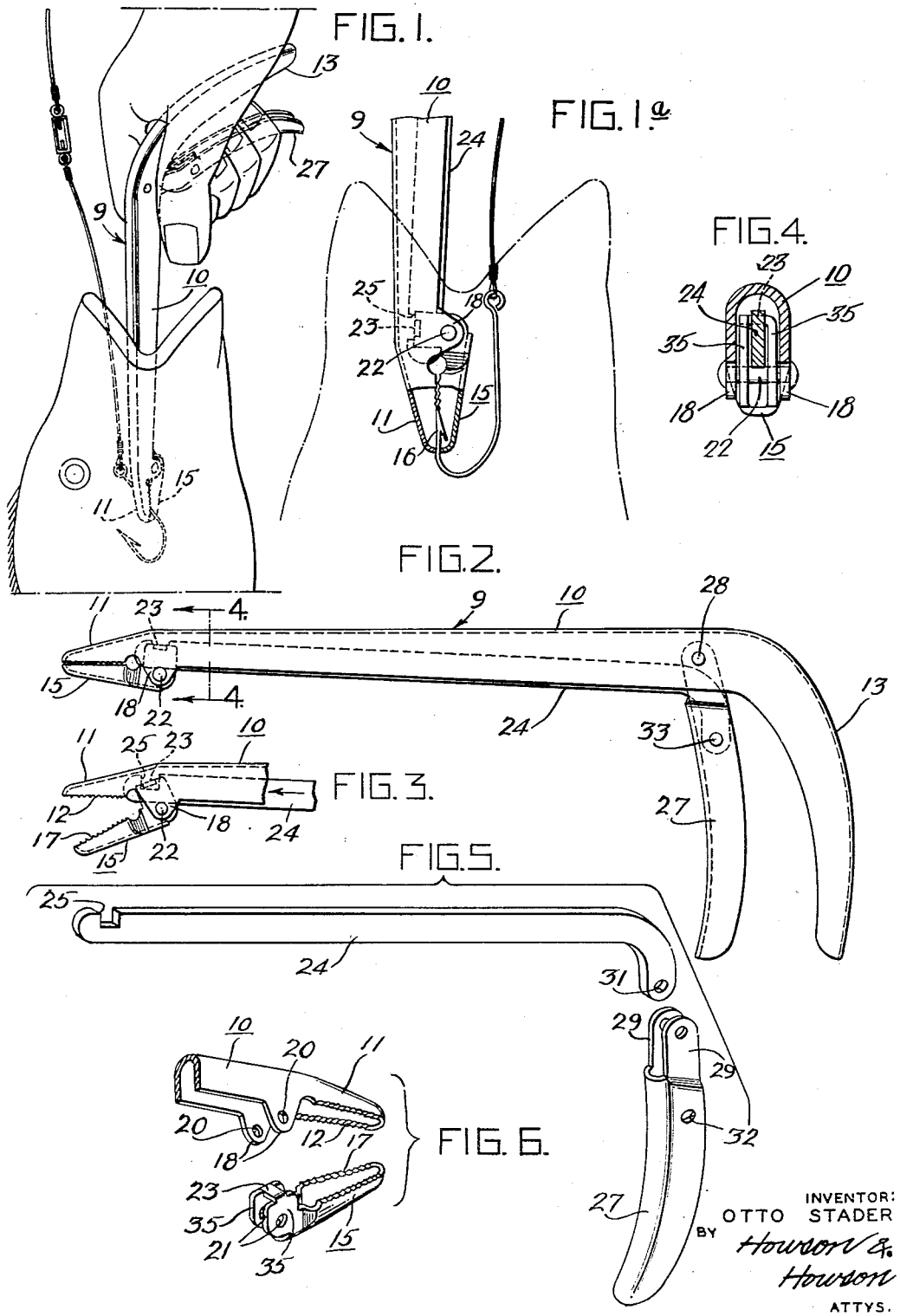
INVENTOR:
OTTO STADER
BY Howson & Howson
ATTYS.

United States Patent Office 2,836,004
Patented May 27, 1958

2,836,004

DEVICE FOR REMOVING FISH HOOKS

Otto Stader, Ardmore, Pa.

Application June 27, 1956, Serial No. 594,156

1 Claim. (Cl. 43—53.5)

The present invention comprises a device for removing fish hooks, and is particularly adapted for insertion into the mouth of the fish to remove hooks which have become embedded in the gullet of the fish.

Prior to the present invention, the conventional method of removing fish hooks was to cut open the fish and cut the hook out of the gullet. This is time-consuming and frequently the fishermen would simply cut or otherwise remove the hook from the line, leaving the hook embedded in the fish until it comes time to clean the fish. The present invention provides a device which is easily carried by the fisherman and is capable of removing the hook with a few simple operations and without mutilating the fish carcass. By means of the present invention, the hook may be removed from the fish and fresh bait may be applied to the hook and fishing resumed with a minimum of lost time.

With the foregoing in mind, the present invention contemplates a readily portable device for removing hooks from the fish without mutilating the carcass.

Another object of the present invention is to provide a device which is compact and free from projections which would snag on the fish carcass in use.

Another object of the invention is to provide a device of the stated character which has jaws capable of completely housing the point of the fish hook during its removal from the carcass so as to eliminate the possibility of the hook snagging and again becoming embedded in the carcass.

Still another object of the invention is to provide a device which is of simple manufacture and is fully effective in operation and use.

All of the objects of the present invention and the various features and details of the construction and operation thereof are more fully set forth hereinafter with reference to the accompanying drawing in which:

Fig. 1 is a view of a device made in accordance with the present invention, showing the operation to free the hook from the gullet of the fish;

Fig. 1a is an enlarged fragmentary view showing the operation of the device of Fig. 1 to remove the hook from the fish;

Fig. 2 is an elevational view of the device shown in Fig. 1 with the jaws closed;

Fig. 3 is a fragmentary view in elevation of the device with the jaws open;

Fig. 4 is a sectional view taken on the line 4—4 of Fig. 2;

Fig. 5 is an exploded perspective view of the operating members of the device shown in Figs. 1 to 4; and Fig. 6 is an exploded perspective view of the jaw members of the device illustrated in Figs. 1 to 5.

Referring now to the drawing, the device comprises a bore member 9 having an elongated shank member 10 which is a U-shaped in cross section, as shown in Fig. 4. At one end of the shank 10 is formed an integral hollow jaw member 11 having a serrated work surface as indicated at 12. The opposite end of the shank 10 is integrally formed with a handle portion 13 projecting at substantially right angles to the shank 10 as shown in Fig. 2. A second jaw 15 is provided to cooperate with the fixed jaw 11 to house the barbed point of the fish hook, for example as indicated at 16 in Fig. 1a. As shown in Figs. 5 and 6, the jaw 15 is hollow and is provided with serrated working surfaces at 17 which register with the serrated surfaces 12 of the fixed jaw. The jaw 15 is pivotally mounted on the shank 10 between depending ears 18, 18 adjacent the jaw 11. The ears 18 and the jaw 15 are provided with registering apertures as indicated at 20 and 21 respectively to receive a pivot pin 22. The base of the jaw 17 is offset inwardly from the working faces thereof as shown in Fig. 6 to be received neatly between the ears 18, 18.

Means is provided to actuate the movable jaw 15. To this end, the base of the jaw 15 is hollow and is provided with a cross piece 23 which spans between the spaced face plates 35, 35 of the base of the jaw. A slide 24 is mounted intermediate the face plates 35 of the jaw 17 and is provided with a notch 25 to receive the cross piece 23. When assembled, the notch is held in engagement with the cross piece 23 by the pivot pin 22 which bears against the undersurface of the slide 24, and prevents downward displacement of the slide out of engagement with the cross piece 23. As shown in Fig. 4, the slide 24 is housed within the shank 10. In the operation of the device, when the slide 24 is displaced forwardly, the notch displaces the cross piece 23 forwardly, thereby pivoting the movable jaw 15 on the pin 22 to open the jaws to the position shown in Fig. 3. Rearward displacement of the slide 24 pivots the jaw 15 clockwise to engage the working surfaces of the jaws 15 and 11.

A trigger 27 is provided to operate the slide 24. In the present instance as shown in Fig. 2, the trigger 27 is pivoted to the shank 10 adjacent the handle portion 13 as indicated at 28. The trigger 27 is provided with inset and upstanding lugs 29, 29 which are received between the walls of the shank 10. The lugs 29, 29 are spaced apart as shown to receive therebetween the rearward extremity of the slide 24. In the present instance, the slide 24 and trigger 27 are provided with registering apertures indicated at 31 and 32 to receive a pivotal connection therebetween. Thus, by squeezing the trigger against the handle 13, the slide 24 is displaced rearwardly to close the jaws 12 and 15. Displacing the trigger 27 away from the handle 13, displaces the slide 24 forwardly to open the jaws. If desired, a spring bias may be provided on the trigger 27 to bias it away from the handle 13, and thereby bias the jaws to the open position.

In the operation of the device, the operator holds the device by the handle 13 with his fingers on the trigger 27 and inserts the jaws into the throat of the fish. When the hook is encountered, the jaws are opened and engaged over the shank of the hook, and the hook is displaced to disengage its barbed point from the flesh of the fish. The jaws are then again opened and are closed over the barbed point of the hook, as shown in Fig. 1a and the hook is withdrawn by simply pulling the device with the hook enclosed in the jaws out of the throat of the fish. Thus, it is unnecessary to cut the fish to remove the hook, and the present invention provides a device which greatly expedites the removal of the hook from a fish and eliminates excessive damage to the fish carcass in the operation.

The present invention also provides a device wherein the working parts are housed within the base member 9, so that the moving parts are protected from contact with the fish and there is little opportunity for the moving parts to snag or catch in the carcass of the fish. The device is of extremely simple manufacture and is readily assembled by the pivotal connections indicated at 22, 28, and 33.

While a particular embodiment of the present invention has been herein illustrated and described, it is not intended to limit the invention to this specific disclosure, but changes and modifications may be made therein and thereto within the scope of the following claim.

I claim:

A device for removing fish hooks comprising a base member having a shank of U-shaped cross-section terminating at one end in a hollow jaw element and terminating at the other end in a handle, a movable hollow jaw element, a pivot pin pivotally mounting said second jaw element on said base member adjacent said first jaw element, said jaw elements cooperating to define a substantially closed housing for the barbed point of a fish hook, said movable jaw element having a base portion comprising spaced face plates and a cross-piece therebetween, a slide element slidable on said pivot pin and mounted between said face plates and interiorly of said shank portion for longitudinal movement therein, means defining a notch in said slide element adjacent the first jaw element engaging said cross-piece of the movable jaw element, said cross piece being spaced apart from said pivot a distance less than the normal height of said slide, and said slide being positioned intermediate said pivot pin and said cross piece with the notch engaging the latter whereby said pivot pin retains said notch in engagement with said cross piece, and operable upon longitudinal displacement of said slide element to pivotally displace said movable jaw element into and away from engagement with said first jaw element, and an operator for said slide element mounted adjacent the handle portion of said base member.

References Cited in the file of this patent

UNITED STATES PATENTS

| | | |
|---|---|---|
| 1,370,814 | Hehmann | Mar. 8, 1921 |
| 2,669,055 | Doerr | Feb. 16, 1954 |